United States Patent
Park et al.

(10) Patent No.: US 10,453,215 B2
(45) Date of Patent: Oct. 22, 2019

(54) DETECT, REFLECT, VALIDATE

(71) Applicant: QUALCOMM Incorporated, San Diego, CA (US)

(72) Inventors: Edwin Chongwoo Park, San Diego, CA (US); Ravishankar Sivalingam, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 15/980,447

(22) Filed: May 15, 2018

(65) Prior Publication Data

US 2018/0336698 A1 Nov. 22, 2018

Related U.S. Application Data

(60) Provisional application No. 62/508,913, filed on May 19, 2017.

(51) Int. Cl.
| | |
|---|---|
| *G06T 7/73* | (2017.01) |
| *G06N 3/08* | (2006.01) |
| *G01C 3/08* | (2006.01) |
| *G06K 9/20* | (2006.01) |
| *G06N 20/00* | (2019.01) |

(52) U.S. Cl.
CPC ............... *G06T 7/73* (2017.01); *G01C 3/08* (2013.01); *G06K 9/2027* (2013.01); *G06K 9/2063* (2013.01); *G06N 3/08* (2013.01); *G06N 20/00* (2019.01)

(58) Field of Classification Search
USPC ......................................................... 348/135
See application file for complete search history.

(56) References Cited

U.S. PATENT DOCUMENTS

| | | | |
|---|---|---|---|
| 9,142,024 B2 * | 9/2015 | Sullivan | G06K 9/3216 |
| 9,716,825 B1 * | 7/2017 | Manzari | H04N 5/23216 |
| 9,892,438 B1 * | 2/2018 | Kundu | G06Q 30/0609 |
| 2016/0122038 A1 * | 5/2016 | Fleischman | G06T 7/73 701/2 |
| 2017/0031369 A1 * | 2/2017 | Liu | G05D 1/102 |
| 2018/0322653 A1 * | 11/2018 | Tatarnikov | G06T 7/73 |

* cited by examiner

Primary Examiner — Behrooz M Senfi
(74) Attorney, Agent, or Firm — Qualcomm Incorporated

(57) ABSTRACT

Techniques are presented for detecting a visual marker. A first image containing the visual marker may be captured at a first time under a first lighting condition. A first image-based detection for the visual marker may be performed based on the first image, using a first detector, to produce a first set of results. A second image containing the visual marker may be captured at a second time under a second lighting condition different from the first lighting condition. Based on the first set of results, a second image-based detection for the visual marker may be performed based on the second image, using a second detector different from the first detector, to produce a second set of results.

30 Claims, 7 Drawing Sheets

 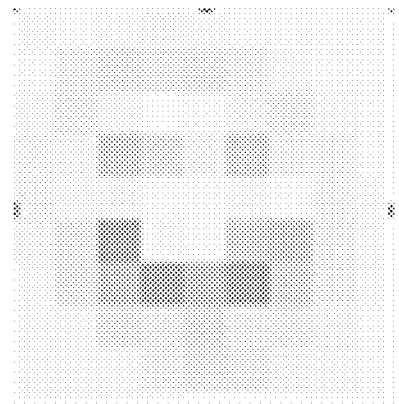
Fig. 1A                    Fig. 1B

DETECT, REFLECT, VALIDATE

CROSS-REFERENCE TO RELATED APPLICATIONS

This application claims the benefit of U.S. Provisional Application No. 62/508,913, filed May 19, 2017, entitled "Detect, Reflect, Validate" which is incorporated herein by reference in its entirety

BACKGROUND

Aspects of the disclosure relate to the detection of visual markers within images. A visual marker is often affixed to physical objects to convey information such as a source, brand, logo, and the like. A human user may be able to identify a visual marker by sight. For example, a child may recognize a particular visual marker affixed to a toy as indicating that the toy is associated with a particular cartoon, franchised story line, or toy manufacturer. In many cases, it is advantageous to have the capability to detect a visual marker through the use of a device. However, using a device to perform image-based detection of a visual marker is challenging, particularly when image capture and/or processing capabilities are limited, which is often the case in real-life scenarios. There is therefore a need for improved techniques in the detection of visual markers.

SUMMARY

Methods, apparatuses, computer readable mediums, and systems are disclosed for detecting a visual marker. A first image containing the visual marker may be captured at a first time T1 under a first lighting condition. A first image-based detection for the visual marker may be performed based on the first image, using a first detector, to produce a first set of results. A second image containing the visual marker may be captured at a second time T2 under a second lighting condition different from the first lighting condition. Based on the first set of results, a second image-based detection for the visual marker may be performed based on the second image, using a second detector different from the first detector, to produce a second set of results. The visual marker may comprise a first material having a first reflective property in response to the first lighting condition and a second material having a second reflective property in response to the second lighting condition.

The second material may overlay the first material. One of the first and second materials may be an infrared (IR)-reflective material. The technique may also involve activating one or more light sources while capturing one of the first and second images. In one embodiment, the first lighting condition and the second lighting condition may correspond to two different intensities of light. In one embodiment, the first lighting condition and the second lighting condition correspond to two different ranges of spectrum of light. The one or more light sources may comprise an IR light source.

Performing the second image-based detection using the second image, based on the first set of results, may comprise: (1) determining a restricted region of interest within the second image, based on the first set of results and (2) performing the second image-based detection for the visual marker within the restricted region of interest within the second image.

Performing the second image-based detection using the second image, based on the first set of results, may comprise determining whether to perform the second image-based detection for the visual marker using the second image, based on the first set of results. The determination of whether to perform the second image-based detection may be made based on a detected size of the visual marker within the first image. The second image-based detection may be performed if the detected size of the visual marker within the first image is less than predetermined size.

Performing the second image-based detection for the visual marker may comprises performing the second image-based detection based on a measure of contrast between a first area of the visual marker associated with the first material having the first reflective property and a second area of the visual marker associated with the second material having the second reflective property within the second image.

The first image-based detection or second image-based detection may be performed using a trained machine learning (ML) model. The first image-based detection or second image-based detection may be performed using a non-ML technique. The first image may be captured using a sensor, and the second image may be captured using the same sensor. Alternatively, the first image may be captured using a first sensor, and the second image may be captured using a second sensor.

In addition, prior to performing a first image-based detection for the visual marker using the first image, a reference object may be detected. The first image-based detection for the visual marker within the first image may be performed based on a known estimated position of the visual marker relative to the reference object.

BRIEF DESCRIPTION OF THE DRAWINGS

Aspects of the disclosure are illustrated by way of example. In the accompanying figures, like reference numbers indicate similar elements.

FIGS. 1A and 1B compare an original image of a visual marker with a low-resolution image of the same visual marker;

DETAILED DESCRIPTION

Figure 2:
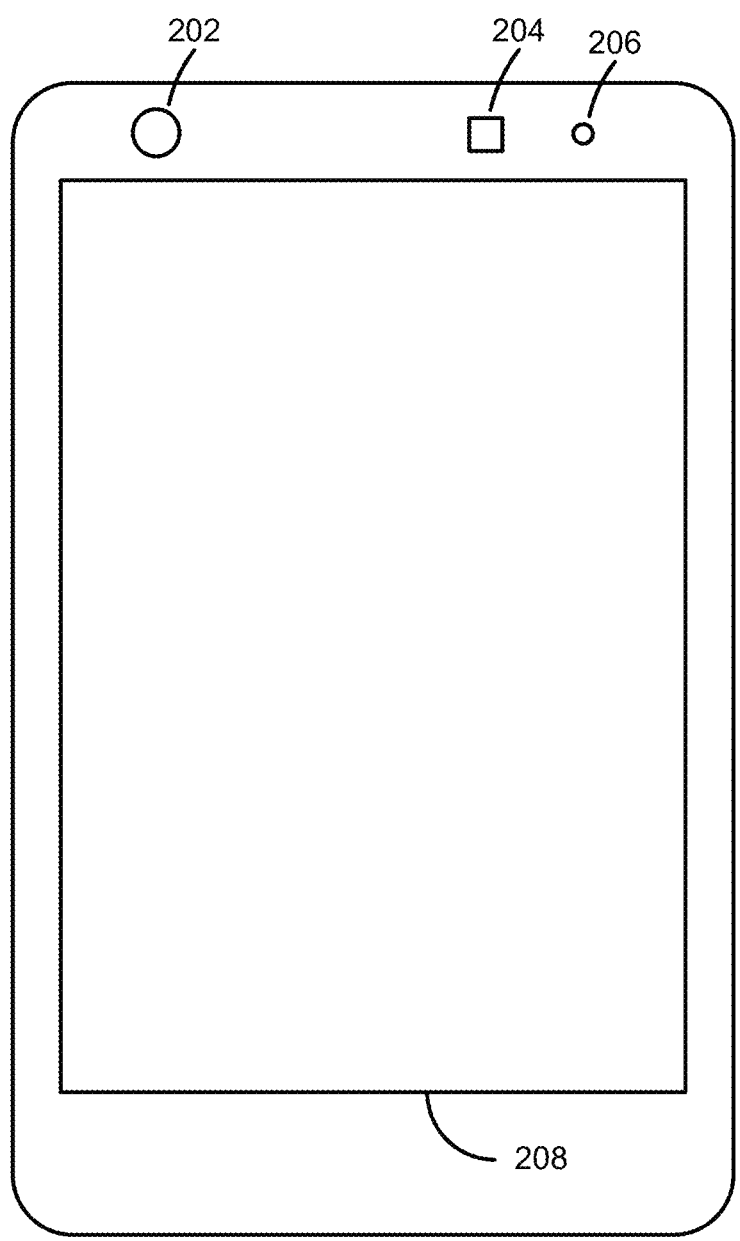
FIG. 2 illustrates the front face of a mobile device capable of performing a two-step detection of a visual marker, according to an embodiment of the invention.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As discussed above, the ability to detect visual markers using a device can have many use cases. For example, a toy equipped with a camera may capture an image of an object in a scene. If an object has an attached visual marker, the toy may have the capability to analyze the captured image to detect the visual marker within the image and, in response, automatically launch an application or routine associated with the brand, franchised story, or manufacturer associated with the visual marker. Alternatively or additionally, a myriad of other useful operations may also be performed in response to detection of such a visual marker. Here, a simple example of a toy is described. However, other types of devices may be implemented with such capabilities. For example, a mobile phone, a wearable device, an augmented reality headset, or other types of devices can incorporate the capability to detect a visual marker.

However, implementation of device-based detection of visual markers can be quite resource intensive. High-resolution image capture and processing can be power hungry and can therefore quickly use up the limited resources (e.g., limited processing capability, limited memory capacity, limited battery reserves, and the like) of a toy, mobile phone, wearable device, AR headset, etc. Instead, low-resolution image capture and processing may provide an alternative, as long as detection of the visual marker can still be reliably achieved.

FIGS. 1A and 1B compare an original image of a visual marker with a low-resolution image of the same visual marker. In the example shown in FIG. 1A, the visual marker is a "smiley face." Such a visual marker may be implemented in many ways. For example, the visual marker may be painted, sewn, laminated, etc. on to a surface of an object. The visual marker may be affixed to a sticker or decal, which may then be affixed to an object. For example, the object may be a wearable device, an item of clothing, a piece of jewelry, etc. FIG. 1B shows a low-resolution image of the "smiley face" visual marker. Here, the low-resolution image shown is a 9-pixel-by-9-pixel image. As can be seen, the low-resolution image still resembles the original image to a certain degree. However, any detail smaller than the size of one pixel within the 9×9-pixel image is lost. Because such details are lost, using the low-resolution image to detect the "smiley face" visual marker is much more challenging. For instance, use of a low-resolution image to detect a visual marker can be associated with a high false alarm rate. At such a low resolution, other visual patterns may start to look like the target visual marker, which can lead to erroneous "detection" of the visual marker—i.e., a false alarm.

FIG. 2 illustrates the front face of a mobile device 200 capable of performing a two-step detection of a visual marker, according to an embodiment of the invention. FIG. 2 shows exterior views of a standard visual sensor 202, an IR light source 204, and an IR-capable sensor 206. Mobile device 200 may also include a display 208. As discussed in more detail below, a two-step approach utilizing a device such as mobile device 200 can achieve device-based detection of visual markers, even when low-resolution images are used to conserve resources. FIG. 2 shows two different types of sensors—a standard visual sensor 202 and an IR-capable sensor 206. However, the two-step approach described herein may be implemented using either a single sensor or multiple sensors.

Figure 3:
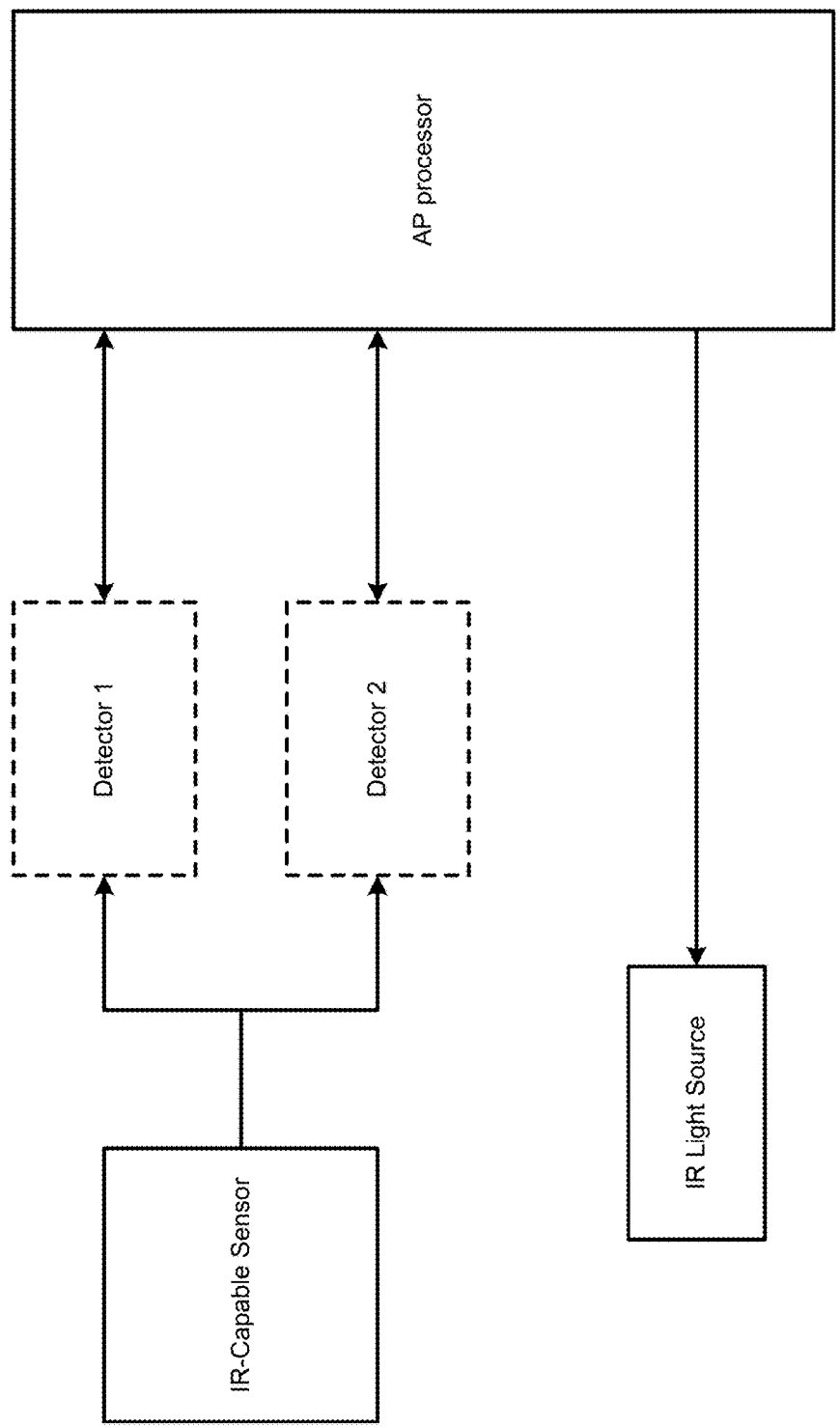
FIG. 3 is a block diagram of illustrative components within a mobile device used for two-step detection of a visual marker, according to an embodiment of the invention.

FIG. 3 is a block diagram of illustrative components within a mobile device used for two-step detection of a visual marker, according to an embodiment of the invention. As shown in FIG. 3, the mobile device may include, among other components, an IR-capable sensor, a first detector, a second detector, an application (AP) processor, and an IR light source. The IR-capable sensor shown in FIG. 3 may correspond to the IR-capable sensor shown in FIG. 2. Operations of the IR-capable sensor, detector 1, detector 2, and IR light source may be controlled, for example, by the AP processor.

The IR-capable sensor is capable of capturing images in both normal visible light and IR light. For example, the IR-capable sensor may be able to capture an image of a scene illuminated by IR light. In addition, the IR-capable sensor may also be able to capture an image illuminated by normal visible light, such as sun light or indoor lighting. Use of an IR-capable camera to capture an image illuminated by normal visible light may be achieved in a variety of ways. In one example, the IR-capable camera may operate over a wide spectrum that spans not only IR frequencies but also visible light frequencies. In another example, the IR-capable camera may operate mainly over IR frequencies but rely on the fact that normal visible light, e.g., sun light, can include IR components, and the IR-capable camera is sensitive enough to capture reflected light resulting from such IR components.

While only one image sensor (i.e., IR-capable sensor) is shown, different embodiments of the invention may employ a different number of sensors. For example, in one embodiment, a first image may be captured at a first time T1 using the IR-capable sensor, and a second image may be captured at a second time T2 using the same IR-capable sensor. In another embodiment, a first image may be captured at time T1 using a first sensor, and a second image may be captured at time T2 using a second sensor.

Detector 1 and Detector 2 refer to two different detection mechanisms, in the sense that they may differ in where they are searching, what they are searching for, etc. For example, as discussed in more detail in later sections, a first detector may search an entire captured image for a visual pattern corresponding to a visual marker. Once the visual pattern has been found by the first detector, a restricted region of interest may be determined. A second detector may search only within the restricted region of interest for a different pattern (e.g., IR-reflected pattern) corresponding to the visual marker. If machine-learning (ML) is used, the first detector may operate using a first ML model trained to detect the visual pattern, and the second detector may operate using a second ML model trained to detect the IR-reflected pattern. Alternatively, the first detector may use an ML model trained to detect a visual pattern, and the second detector may utilize a non-ML technique, such as simply detecting a heightened intensity of IR light within the restricted area of interest determined by the first detector.

Detector 1 and detector 2 may be implemented in a variety of ways. Detectors 1 and 2 may be implemented in hardware, software, or a combination of hardware and software. For example, detectors 1 and 2 may be implemented as two separate pieces of dedicated hardware (e.g., semiconductor areas or semiconductor devices) outside of the AP processor. Detectors 1 and 2 may be implemented as part of the AP processor, either as physical sub-components within the AP processor hardware or as sub-components within one or more software routines carried out by the AP processor. In fact, detectors 1 and 2 may be implemented using the same hardware or software structure, if the structure is sufficiently flexible to carry out the two different detection mechanisms corresponding to detectors 1 and 2.

According to one embodiment, a first image is captured while the IR light source is not activated, and a second image is captured while the IR light source is activated. This is an example of capturing two images of the same scene under different lighting conditions. While an IR light source is shown in FIG. 3, other types of light sources may be used. For example, a simple red light emitting diode (LED) may be used that outputs light in a particular spectrum (i.e., red color light). These and other types of light sources may be adopted to realize two different lighting conditions corresponding to the capture of two different images of the same scene.

Figure 4A:
FIGS. 4A, 4B, and 4C depict the combination of a visual pattern and an IR mask, to result in a visual marker that facilitates two-step detection, in accordance with an embodiment of the invention.
Figure 4B:
Figure 4C:
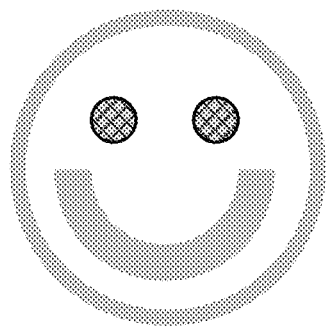

FIGS. 4A, 4B, and 4C depict the combination of a visual pattern and an IR mask, to result in a visual marker that facilitates two-step detection, in accordance with an embodiment of the invention. FIG. 4A shows a visual pattern for a visual marker of a "smiley face." The visual pattern refers to the visible component of the visual marker. As discussed previously, the visual marker may be painted, sewn, laminated, etc. on to a surface of an object. The visual marker may be affixed to a sticker or decal, which may then be affixed to an object.

FIG. 4B shows an IR mask that may overlaid on top of the visual pattern. According to an embodiment, the IR mask may be a coating that is clear to the human eye. For example, the visual pattern of the smiley face may comprise a first material, e.g., a cloth decal. The IR mask may comprise a second material, e.g., an IR reflective coating, that is applied on top to overlay the first material. The IR mask appears transparent, because it allows light in the visible spectrum to pass through with little or no reflection. The IR mask, however, reflects light in the IR spectrum. While an IR mask is shown here, other types of masks may be used to facility the capture of two different images of the same scene under different lighting conditions. Furthermore, the mask used may be reflective in different ways. In one embodiment, the mask may be retro reflective. That is, the mask may reflect light back mainly toward the light source, with minimal scattering. Thus, an IR mask that is retro reflective may reflect IR light back mainly toward the IR light source, without reflecting much IR light in other directions. In another embodiment, the mask may reflect in a more dispersive manner, scattering reflected light in different directions and not focused toward the light source. The IR mask may be composed of different types of physical materials. In one example, the IR mask comprises a layer of clear, IR retro reflective paint that applied over the eyes of the smiley face visual pattern.

FIG. 4C shows the visual marker that results from combining the visual pattern of FIG. 4A and the IR mask depicted in FIG. 4B. Note that in the present embodiment, the IR mask is clear. However, for ease of illustration in these figures, FIGS. 4B and 4C show the IR mask with a hashed pattern. Because the IR mask is clear in this example, the combined visual marker shown in FIG. 4C looks no different to the human eye from the visual pattern alone shown in FIG. 4A. Such an embodiment is advantageous for user recognition of the visual marker in various implementations. For example, if the visual marker represents a particular logo for a toy, a child may recognize the visual pattern of the logo. Because the IR mask is clear, that fact that it is overlaid on top of the visual pattern would not distract from the child's visual recognition of the logo. While visual perception by a human of the combined visual marker shown in FIG. 4C might be no different than that of the visual pattern alone shown in FIG. 4A, device-based perception of the visual pattern versus the IR mask-overlaid visual marker can be quite different, especially under different lighting conditions, as discussed in more detail below.

Figure 5A:
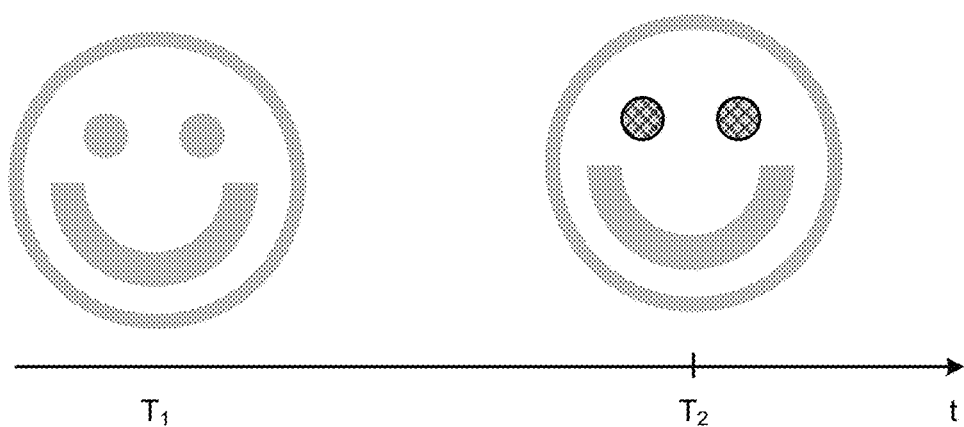
FIG. 5A illustrates the capture of a first image at a first time T1 and a second image at a second time T2 under different lighting conditions, of a visual marker overlaid with a particular mask ("bright eyes")

FIG. 5A illustrates the capture of a first image at a first time T1 and a second image at a second time T2 under different lighting conditions, of a visual marker overlaid with a particular mask ("bright eyes"). At time T1, a first image containing the visual marker is captured under a first lighting condition. In one embodiment, the first lighting condition corresponds to normal indoor or outdoor visible light.

A first image-based detection for the visual marker is performed based on the first image, using for example, the detector 1 depicted in FIG. 3. The first image-based detection may involve attempting to detect the visual pattern corresponding to the visual marker (e.g., "smiley face") within the captured first image. A variety of different techniques may be employed to perform such detection. In one embodiment, a machine learning (ML) technique is used. A model may be previously trained to recognize the visual pattern, using a body of training images and known results—i.e., a variety of images that are not identical but all contain the smiley face visual pattern, as well as a variety of images that are not identical to one another but known to not contain the smiley face visual pattern. The detector may include such a trained ML model. Performance of the first image-based detection may generate a first set of results, which may comprise (1) whether the visual pattern is detected within the first image, (2) a confidence value corresponding to the level of certainty of the detection (or lack of detection) of the visual pattern, (3) an estimated location/size of the detected visual pattern, and/or other results.

At time T2, a second image containing the visual marker may be captured under a second lighting condition. In one embodiment, the second lighting condition corresponds to activation of an IR light source. That is, the second image may be captured while the IR light source is illuminated.

A second image-based detection for the visual marker is performed based on the second image, using for example, the detector 2 depicted in FIG. 3. The second image-based detection is performed based on the first set of results produced by the first image-based detection. For example, the first set of results may include the estimated position and size of the visual marker within the image, upon which a restricted region of interest may be determined. Thus, detector 2 may focus on the restricted region of interest in performing the second image-based detection. This gives detector 2 a head start and a smaller search area. Given such a head start, the second image-based detection may be implemented in a wide variety of ways, ranging from simple to more complex.

In one simple example, detector 2 may merely attempt to detect a threshold of brightness within the restricted region of interest within the second image. Here, the second image may be a monochromatic (e.g., black and white) image captured by the IR-capable sensor. Detector 2 may simply obtain a sum or average of all monochromatic pixel values within the restricted region of interest (e.g., small area covering the region of the eyes of the smiley face) within the second image, compare the sum or average to a predetermined threshold, and determine whether the IR mask has been detected or not based on the comparison to the threshold. If the sum or average reaches or exceeds the threshold, detector 2 can conclude that the IR mask has been detected. Otherwise, detector 2 can conclude that the IR mask has not been detected. The second set of results produced by the second image-based detection, in this example, may comprise such a detection of whether (or not) the IR mask has been detected within the second image. Thus, the second image-based detection may serve the purpose of providing confirmation that the first image-based detection did not make an error. In particular, when the first image detection produces a positive result (i.e., visual marker detected), the second image-based detection may help to determine whether the positive result from the first image-based detection was a true positive ("hit) or a false positive ("false alarm").

In a more complex example, detector 2 may search for the actual IR mask within the second image. For example, detector 2 may utilize an ML model trained to detect the IR mask, e.g., the "bright eyes" shown in FIG. 5A. Within the second image, a large contrast in intensity may exist between the pixel values corresponding to the eyes of the smiley face versus the pixel values outside the eyes of the smiley face. This dramatic contrast in pixel values may be particular useful to the ML model trained to detect the IR mask. Thus, the ML model used on the second image captured at T2 may be very different from the ML model used on the first image captured at T1—they may be looking for very different things. Here, the second set of results may comprise (1) whether the IR mask is detected within the second image, (2) a confidence value corresponding to the level of certainty of the detection (or lack of detection) of the IR mask, (3) an estimated location/size of the detected IR mask, and/or other results.

The use of a two-step image-based detection scheme for a visual marker, such as that described above, has significant advantages. Particularly in low-power applications, only low-resolution images may be available. However, reliable detection of a visual marker using low-resolution images is quite challenging. One particular problem is the tradeoff between misses and false alarms. If a detector is designed to broadly detect most if not all possible occurrences of a visual marker, the detector may generate too many positives, including false positive ("false alarms"). However, if the detector is designed to narrowly detect only more certain occurrences of the visual marker, the detector may generate too many negatives, including false negatives ("misses"). Given the low-resolution of the images available, it may not be possible to a single detector to be designed to reach a happy medium where the rates of false alarms and misses are both acceptable. The two-step detection scheme described herein allow for a first detector to capture most or all potential visual markers and a second detector to weed out instances of mistaken detection of the visual marker by the first detector that turn out to be false positives. For example, in one embodiment, the first detector may be trained (e.g., in a machine-learning context) or otherwise designed with a first false-alarm rate, and the second detector may be trained or otherwise designed with a second false-alarm rate. The first false-alarm rate may be higher than the second false-alarm rate. Such a two-step detection scheme thus achieves reliable detection of a visual marker based on low-resolution images.

According to one embodiment, the second image-based detection may or may not need to be performed, depending on the outcome of the first image-based detection. That is, performance of the second image-based detection may be conditioned on the first set of results produced by the first image-based detection. As discussed previously, the first set of results produced from the first image-based detection may include information regarding the location/size of the visual pattern associated with the visual marker, as detected within the first image. If the size of the detected visual pattern is large enough, e.g., compared to a predetermined size threshold, it may not be necessary to perform the second image-based detection. Such an implementation is based on the recognition that the size of the detected visual pattern within the first image may correlate strongly with the reliability of the detection. For example, as can be seen in the 9×9-pixel image shown in FIG. 1B, the number of pixels spanned by the visual marker can depends on how "large" the visual marker is within the image. If the visual marker is placed close in proximity to the sensor, it is more likely that the visual marker will span across more pixels in the 9×9 image. On the other hand, if the visual marker is placed far from the sensor, it is more likely that the visual marker will span fewer pixels in the 9×9 image. In certain implementations, even a low-resolution image has a sufficient number of pixels such that the first image-based detection can reliability detect the visual marker, provided that the visual marker spans across enough of the available pixels. In that case, the IR light source (if one is employed) does not need to be activated, the second image does not need to be captured, and the second image-based detection does not need to be performed. On the other hand, if the visual marker does not span across enough of the available pixels, the IR light source may need to activated, the second image captured, and the second image-based detection performed, in order to improve upon the reliability of the detection of the visual marker.

Figure 5B:
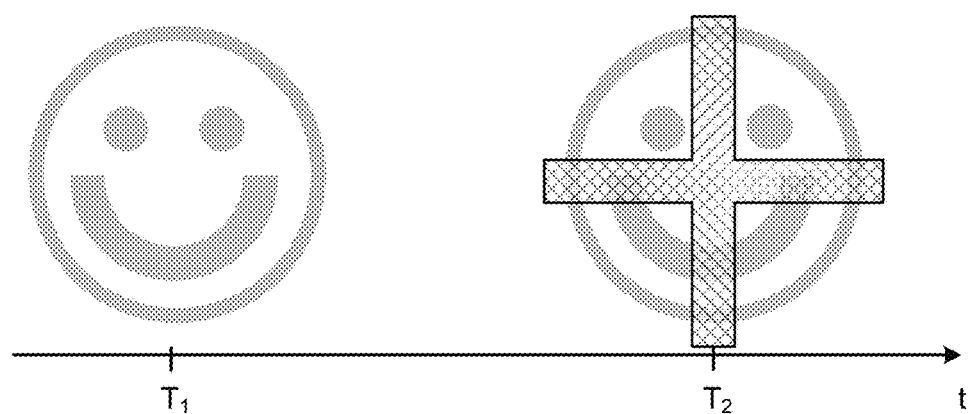
FIG. 5B illustrates the capture of a first image at a first time T1 and a second image at a second time T2 under different lighting conditions, of a visual marker overlaid with a different IR mask ("bright cross mark")

FIG. 5B illustrates the capture of a first image at a first time T1 and a second image at a second time T2 under different lighting conditions, of a visual marker overlaid with a different IR mask ("bright cross mark"). Here, the capture of the first and second images, as well as the performance of the first and second image-based detections, may be similar to that associated with FIG. 5A. However, the IR mask used is quite different. FIG. 5B shows that the IR mask used does not have to correspond to the visual pattern of the visual marker. Here, the IR mask resembles a cross mark, which has no relation to the smiley face visual pattern. Nevertheless, the second image-based detection can operate to facilitate the reliable detection of the visual marker. For example, the second image-based detection can still be implemented as a simple brightness threshold detector within the restricted region of interest. The first image-based detection may yield an estimated location/size of the visual pattern of the smiley face from the first image captured at T1. The system has prior knowledge of the likely position of the "cross mark" relative to the smiley face pattern. Based on this knowledge, the system may determine a restricted region of interest within which the cross mark is likely to appear within the second image. The restricted region of interest may have a shape similar to the cross mark, for example, with broader boundaries. Detector 2 may then attempt to detect the IR mask within the restricted region of interest. The second image-based detection can also be implemented as a more complex detector, such as a ML-based detector, as previously described.

According to an embodiment of the invention, the order in which the image-based detections are performed can be changed. For example, instead of the order shown in FIGS. 5A and 5B, the system may first detect the IR mask first, then detect the image pattern. For example, a background-level reference image may be taken prior to activating the IR light source. Then, the IR light source may be activated and an IR-illuminated image taken. The IR-illuminated image may be used to identify the area(s) within the image associated with increased light intensity resulting from IR illumination (e.g., by comparison to the background-level reference image). Then, image-based detection may be performed to detect the visual pattern of the smiley visual marker within the area(s) associated with increased light intensity from IR illumination. For example, referring back to FIG. 5A, the system can look for the "eyes" of the smiley face based on IR illumination, then narrow the search area for the visual pattern of the smiley face. In one embodiment, the IR light source may be activated, an image may be captured and image-based detection performed on the IR-illuminated image to detect the IR mask, followed by de-activating the IR light, capturing an image without the IR light source, and image-based detection performed on the naturally illuminated image to detect the visual pattern of the smiley face visual marker.

Figure 6:
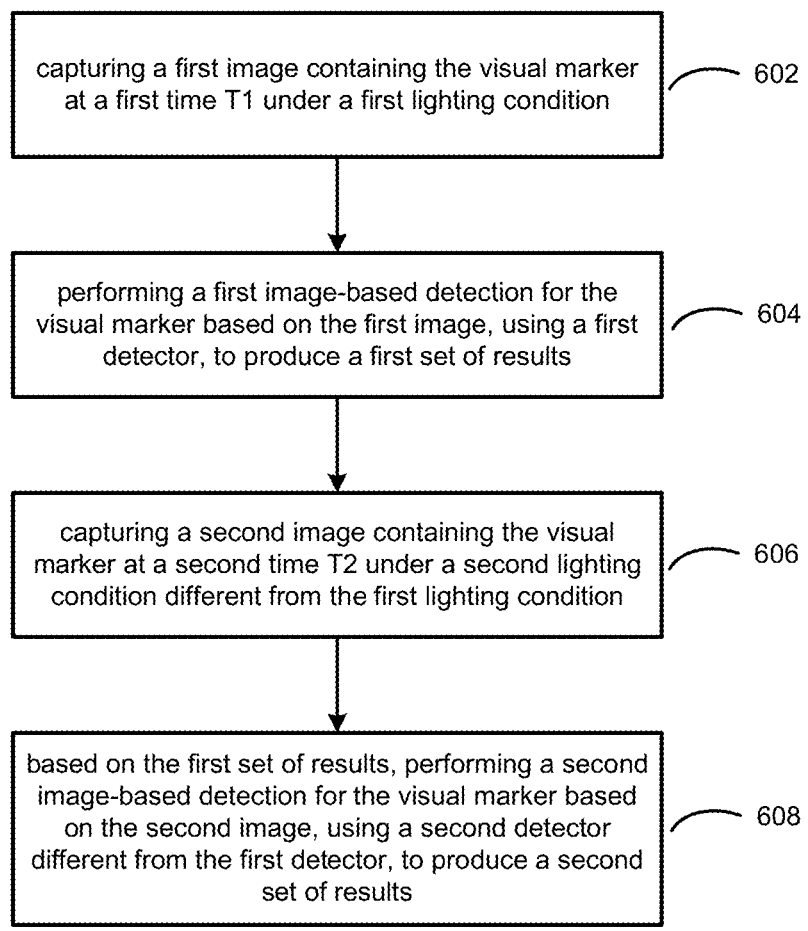
FIG. 6 is a flow chart showing steps of a process for detecting a visual marker in accordance with one embodiment of the invention.

FIG. 6 is a flow chart showing steps of a process 600 for detecting a visual marker in accordance with one embodiment of the invention. First, in a step 602, the process involves capturing a first image containing the visual marker at a first time T1 under a first lighting condition. Next, in a step 604, the process involves performing a first image-based detection for the visual marker based on the first image, using a first detector, to produce a first set of results. Next, in a step 606, the process involves capturing a second image containing the visual marker at a second time T2 under a second lighting condition different from the first lighting condition. Next, in a step 608, the process involves, based on the first set of results, performing a second image-based detection for the visual marker based on the second image, using a second detector different from the first detector, to produce a second set of results.

Figure 7:
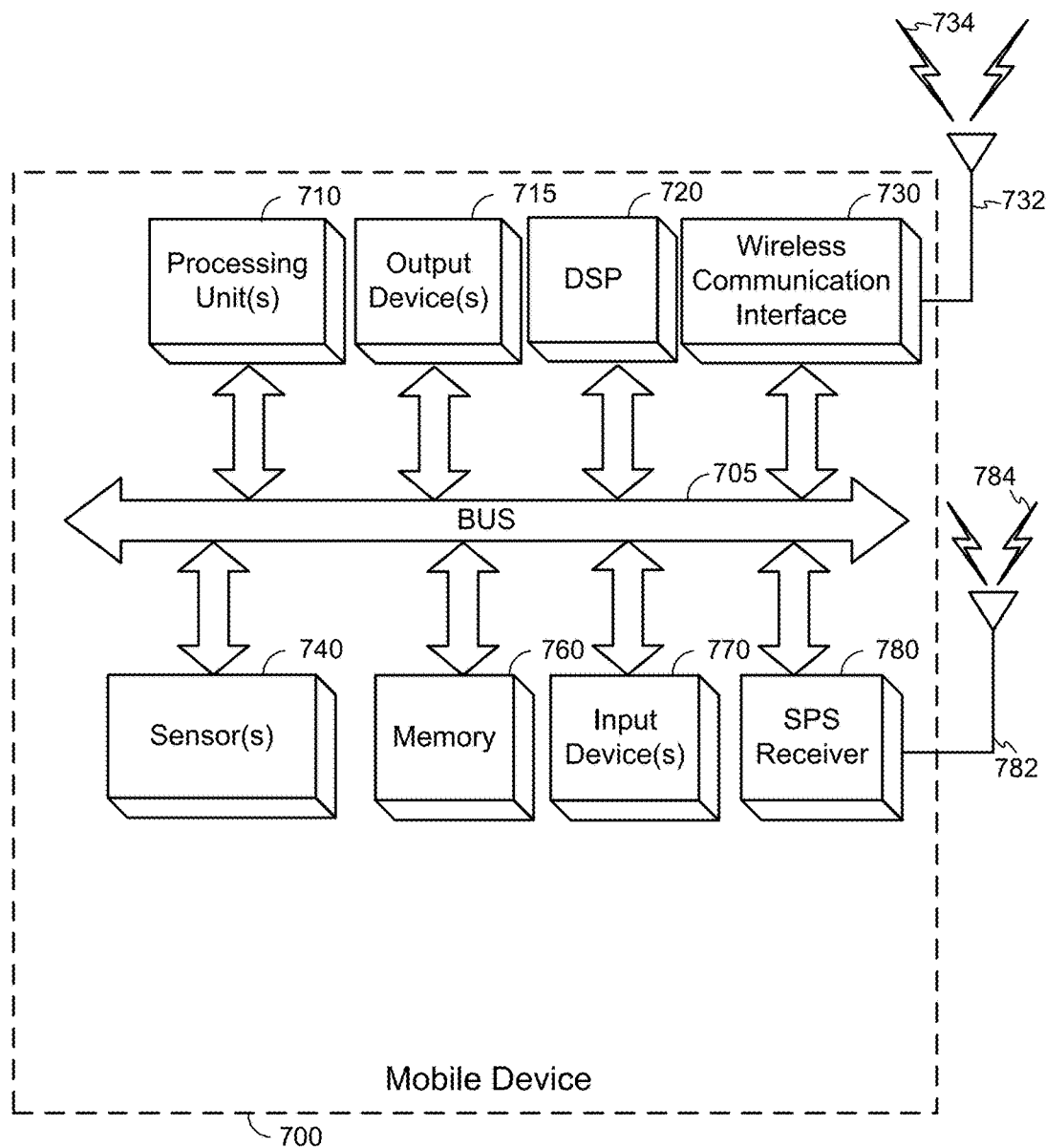
FIG. 7 illustrates internal components of a mobile device 700, according to an embodiment of the invention.

FIG. 7 illustrates internal components of a mobile device 700 in which the disclosed methods, apparatuses, computer-readable medium, and/or means can be implemented, according to an embodiment of the invention. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations.

The mobile device 700 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 7, some embodiments may have a separate DSP 720, depending on desired functionality. The mobile device 700 also can include one or more input devices 770, which can include without limitation a touch screen, a touch pad, microphone, button(s), dial(s), switch(es), and/or the like; and one or more output devices 715, which can include without limitation a display, light emitting diode (LED), speakers, and/or the like.

The mobile device 700 might also include a wireless communication interface 730, which can include without limitation a modem, a network card, an infrared communication device, a wireless communication device, and/or a chipset (such as a Bluetoothä device, an IEEE 802.11 device, an IEEE 802.16.4 device, a WiFi device, a WiMax device, cellular communication facilities, etc.), and/or the like. The wireless communication interface 730 may permit data to be exchanged with a network, wireless access points, other computer systems, and/or any other electronic devices described herein. The communication can be carried out via one or more wireless communication antenna(s) 732 that send and/or receive wireless signals 734.

Depending on desired functionality, the wireless communication interface 730 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A Wireless Local Area Network (WLAN) may also be an IEEE 802.11x network, and a Wireless Personal Area Network (WPAN) may be a Bluetooth network, an IEEE 802.16x, or some other type of network. The techniques described herein may also be used for any combination of WWAN, WLAN and/or WPAN.

The mobile device 700 can further include sensor(s) 740. Such sensors can include, without limitation, one or more accelerometer(s), gyroscope(s), camera(s), magnetometer(s), altimeter(s), microphone(s), proximity sensor(s), light sensor(s), and the like.

Embodiments of the mobile device may also include a Satellite Positioning System (SPS) receiver 780 capable of receiving signals 784 from one or more SPS satellites using an SPS antenna 782. The SPS receiver 780 can extract a position of the mobile device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 780 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 700 may further include and/or be in communication with a memory 760. The memory 760 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the mobile device 700 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for detecting a visual marker comprising:
capturing a first image containing the visual marker at a first time T1 under a first lighting condition;
performing a first image-based detection for the visual marker based on the first image, using a first detector, to produce a first set of results;
capturing a second image containing the visual marker at a second time T2 under a second lighting condition different from the first lighting condition; and
based on the first set of results, performing a second image-based detection for the visual marker based on the second image, using a second detector different from the first detector, to produce a second set of results,
wherein the visual marker comprises a first material having a first reflective property in response to the first lighting condition and a second material having a second reflective property in response to the second lighting condition.

2. The method of claim 1, wherein the second material overlays the first material.

3. The method of claim 1, further comprising a step of activating one or more light sources while capturing one of the first and second images.

4. The method of claim 3, wherein the one or more light sources comprise an infrared (IR) light source.

5. The method of claim 1, wherein the first lighting condition and the second lighting condition correspond to two different intensities of light.

6. The method of claim 1 wherein the first lighting condition and the second lighting condition correspond to two different ranges of spectrum of light.

7. The method of claim 1, wherein one of the first and second materials is an IR-reflective material.

8. The method of claim 1, wherein one of the first and second materials is a retroreflective material.

9. The method of claim 1, wherein performing the second image-based detection using the second image, based on the first set of results, comprises:
   determining a restricted region of interest within the second image, based on the first set of results; and
   performing the second image-based detection for the visual marker within the restricted region of interest within the second image.

10. The method of claim 1, wherein performing the second image-based detection using the second image, based on the first set of results, comprises:
    determining whether to perform the second image-based detection for the visual marker using the second image, based on the first set of results.

11. The method of claim 10,
    wherein the determination of whether to perform the second image-based detection is made based on a detected size of the visual marker within the first image; and
    wherein the second image-based detection is performed if the detected size of the visual marker within the first image is less than predetermined size.

12. The method of claim 1, wherein performing the second image-based detection for the visual marker comprises:
    performing the second image-based detection based on a measure of contrast between a first area of the visual marker associated with the first material having the first reflective property and a second area of the visual marker associated with the second material having the second reflective property within the second image.

13. The method of claim 1, wherein the first image-based detection or second image-based detection is performed using a trained machine learning (ML) model.

14. The method of claim 1, wherein the first image-based detection or second image-based detection is performed using a non-ML technique.

15. The method of claim 1, wherein and the first image is captured using a sensor, and the second image is captured using the sensor.

16. The method of claim 1, wherein the first image is captured using a first sensor, and the second image is captured using a second sensor.

17. The method of claim 1, further comprising:
    prior to performing the first image-based detection for the visual marker using the first image, detecting a reference object; and
    wherein the first image-based detection for the visual marker within the first image is performed based on a known estimated position of the visual marker relative to the reference object.

18. An apparatus for detecting a visual marker comprising:
    one or more sensors for capturing a first image containing the visual marker at a first time T1 under a first lighting condition and capturing a second image containing the visual marker at a second time T2 under a second lighting condition different from the first lighting condition;
    a first detector for performing a first image-based detection for the visual marker based on the first image, to produce a first set of results; and
    a second detector for performing, based on the first set of results, a second image-based detection for the visual marker based on the second image, to produce a second set of results, wherein the second detector is different from the first detector;
    wherein the visual marker comprises a first material having a first reflective property in response to the first lighting condition and a second material having a second reflective property in response to the second lighting condition.

19. The apparatus of claim 18, wherein the second material overlays the first material.

20. The apparatus of claim 18, wherein one of the first and second materials is an IR-reflective material.

21. The apparatus of claim 18, wherein the second detector is configured to perform the second image-based detection using the second image, based on the first set of results, by:
    determining a restricted region of interest within the second image, based on the first set of results; and
    performing the second image-based detection for the visual marker within the restricted region of interest within the second image.

22. The apparatus of claim 18, wherein the second detector is configured to perform the second image-based detection using the second image, based on the first set of results, by:
    determining whether to perform the second image-based detection for the visual marker using the second image, based on the first set of results.

23. The apparatus of claim 22,
    wherein the determination of whether to perform the second image-based detection is made based on a detected size of the visual marker within the first image; and
    wherein the second detector is configured to perform the second image-based detection if the detected size of the visual marker within the first image is less than predetermined size.

24. Computer readable medium having stored therein code for causing a processor to perform operations for detecting a visual marker comprising:
    code for causing a first image containing the visual marker to be captured at a first time T1 under a first lighting condition;
    code for causing a first image-based detection for the visual marker based on the first image to be performed, using a first detector, to produce a first set of results;
    code for causing a second image containing the visual marker to be captured at a second time T2 under a second lighting condition different from the first lighting condition; and code for causing a second image-based detection for the visual marker based on the first set of results to be performed, based on the second image, using a second detector different from the first detector, to produce a second set of results, wherein the visual marker comprises a first material having a first reflective property in response to the first lighting condition and a second material having a second reflective property in response to the second lighting condition.

25. The computer readable medium of claim 24, wherein the second material overlays the first material.

26. The computer readable medium of claim 24, wherein one of the first and second materials is an IR-reflective material.

27. The computer readable medium of claim 24, wherein the code for performing the second image-based detection using the second image, based on the first set of results, comprises:

code for determining a restricted region of interest within the second image, based on the first set of results; and code for performing the second image-based detection for the visual marker within the restricted region of interest within the second image.

28. The computer readable medium of claim 24, wherein the code for performing the second image-based detection using the second image, based on the first set of results, comprises:

code for determining whether to perform the second image-based detection for the visual marker using the second image, based on the first set of results.

29. The computer readable medium of claim 28, wherein the determination of whether to perform the second image-based detection is made based on a detected size of the visual marker within the first image; and wherein the second image-based detection is performed if the detected size of the visual marker within the first image is less than predetermined size.

30. A system for detecting a visual marker comprising:

means for capturing a first image containing the visual marker at a first time T1 under a first lighting condition;

means for performing a first image-based detection for the visual marker based on the first image, using a first detector, to produce a first set of results;

means for capturing a second image containing the visual marker at a second time T2 under a second lighting condition different from the first lighting condition; and means for, based on the first set of results, performing a second image-based detection for the visual marker based on the second image, using a second detector different from the first detector, to produce a second set of results, wherein the visual marker comprises a first material having a first reflective property in response to the first lighting condition and a second material having a second reflective property in response to the second lighting condition.

* * * * *